United States Patent
Yang

(10) Patent No.: US 7,145,557 B2
(45) Date of Patent: *Dec. 5, 2006

(54) ROLLER CONSTRUCTION WITH DIRECTION FINDING FOR A MOBILE NAVIGATION DEVICE

(75) Inventor: Hui-Ping Yang, Lujhu Township, Taoyuan County (TW)

(73) Assignee: Speed Tech Corp., Taoyuan County (TW)

( * ) Notice: Subject to any disclaimer, the term of this patent is extended or adjusted under 35 U.S.C. 154(b) by 45 days.

This patent is subject to a terminal disclaimer.

(21) Appl. No.: 10/863,208

(22) Filed: Jun. 9, 2004

(65) Prior Publication Data

US 2005/0275639 A1    Dec. 15, 2005

(51) Int. Cl.
*H04M 1/00* (2006.01)
(52) U.S. Cl. .................. 345/184; 455/90.3; 455/550.1
(58) Field of Classification Search .................... 200/4, 200/11, 17 R, 18, 5 R, 6 A; 455/575.1, 550.1, 455/90.3
See application file for complete search history.

(56) References Cited

U.S. PATENT DOCUMENTS

| | | | | |
|---|---|---|---|---|
| 6,097,964 A | * | 8/2000 | Nuovo et al. | 455/566 |
| 6,555,768 B1 | * | 4/2003 | Deruginsky et al. | 200/4 |
| 6,810,265 B1 | * | 10/2004 | Tochihara | 455/550.1 |
| 6,862,459 B1 | * | 3/2005 | Sawada et al. | 455/550.1 |

\* cited by examiner

*Primary Examiner*—Lester G. Kincaid
*Assistant Examiner*—Shantell L. Portis
(74) *Attorney, Agent, or Firm*—Troxell Law Office, PLLC

(57) ABSTRACT

The present invention is a roller construction with direction finding for a mobile navigation device. The present invention comprises a hollow conductive ring with several slots at an end, wherein a contacting area is set on the inner surface of the protruding part between each two neighboring slots; a support to plug the conductive ring; and a plurality of terminals plugged in from both two end surfaces of the conductive ring, wherein the terminals at one end surface are plugged in at the depth no deeper than the bottoms of the slots. By the simple structure of the present invention, the conductive ring interacts with the terminals, wherein the first rolling direction can be differed from the second rolling direction by signals sent with time differential.

10 Claims, 19 Drawing Sheets

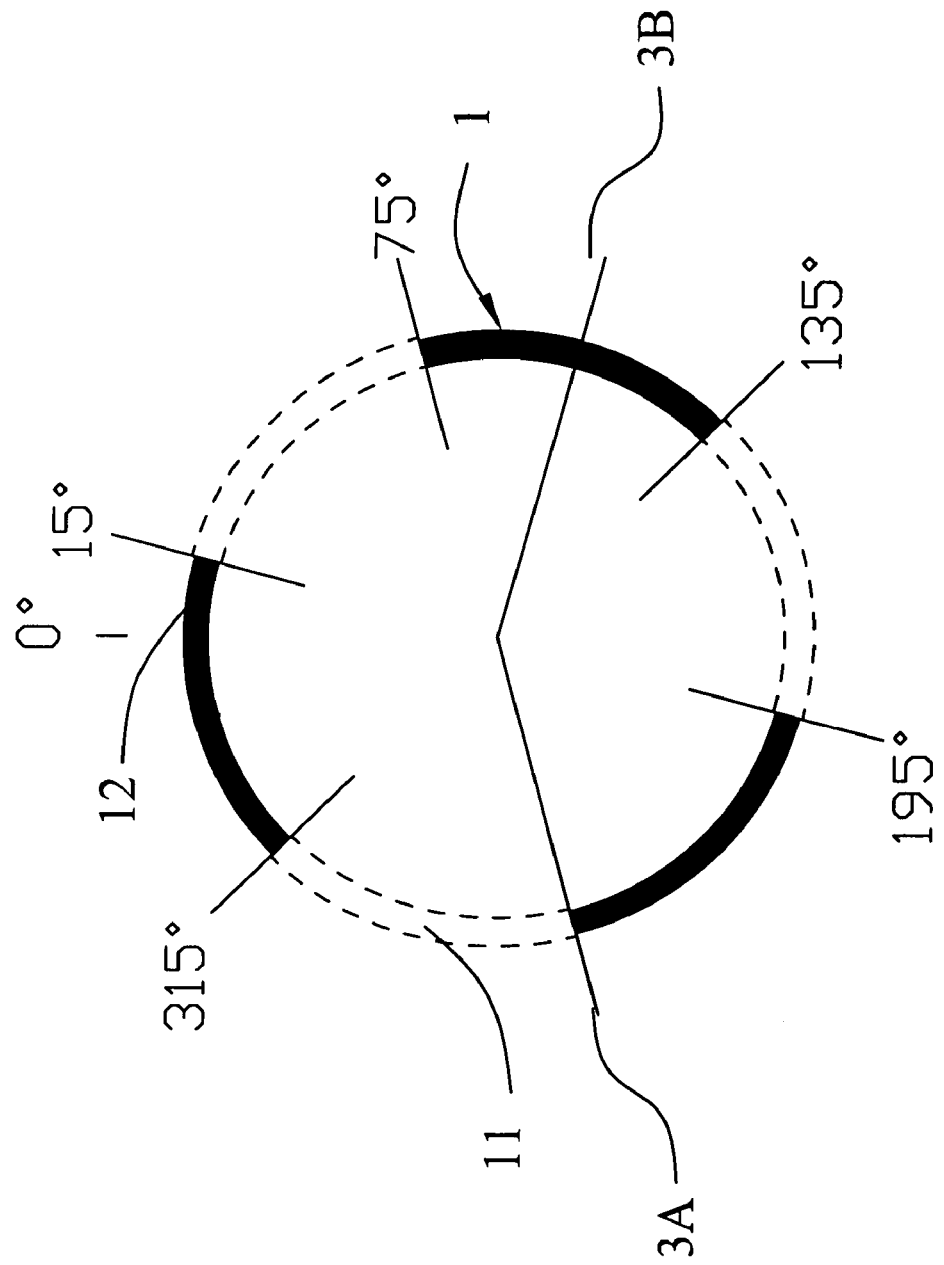

ROLLER CONSTRUCTION WITH DIRECTION FINDING FOR A MOBILE NAVIGATION DEVICE

FIELD OF THE INVENTION

The present invention relates to a roller construction with direction finding for a mobile navigation device. More particularly, the present invention relates to the conductive ring would interact with the terminals to sent signals with time differential so that the first rolling direction can be differed from the second rolling direction.

DESCRIPTION OF THE PRIOR ART

The technology of mobile communication has progressed a lot during the past years, so the role of roller construction is becoming increasingly important. Traditionally, the prior art 'navigation key for a handset' (U.S. Pat. No. 6,097,964, shown in FIG. 8) comprises a roller body 40. The roller body 40 comprises a shaft 41 in the middle. A bearing 42 and an encoder unit 46 are between the roller body 40 and the shaft 41. A metallic disc 44 and an outer bushing 45 are between the roller body 40 and the encoder unit 46. And a locking member 43 is set on the outer side of the encoder unit 46. Accordingly, a navigation key is constructed to select and pick up the information inside.

Although the above 'navigation key for a handset' is used to select and pick up the information inside, it can only choose to move forward or backward or can be pressed down to confirm by the whole structure of the outer bushing 45 together with an encoder unit 46. But, as shown in FIG. 8, its structure is very complicated. As is concerned, the mobile handset nowadays emphasizes much upon its slightness, thinness, and smallness. In order to install a device with such a complicated structure into a mobile handset, some problems may easily happen concerning the working hour and the working process. The structure for transferring the signals is quite complicated too. Besides, as transferring the signals by such a structure, the characteristic and the efficiency of the transference are not desirable.

BRIEF SUMMARY OF THE INVENTION

The purpose of the present invention is to construct a better roller construction with direction finding for a mobile navigation device, wherein the first rolling direction can be differed from the second rolling direction by sending signals with time differential.

To achieve the above purposes, the present invention is a roller construction with direction finding for a mobile navigation device, comprising a hollow conductive ring with several slots at an end, wherein a contacting area is on the inner surface of the protruding part between each two neighboring slots; and a plurality of terminals plugged in from both end surfaces of the conductive ring to produce prestress on the inner surface of the conductive ring, wherein the terminals at one end surface are plugged in at the depth no deeper than the bottoms of the slots. By turning the conductive ring to make the terminals interact with the slots and the contacting area at one end surface of the conductive ring, signals with time differential are sent so that the first rolling direction can be differed from the second rolling direction.

BRIEF DESCRIPTION OF THE DRAWINGS

The present invention will be better understood from the following detailed description of preferred embodiments of the invention, taken in conjunction with the accompanying drawings, in which.

DESCRIPTION OF THE PREFERRED EMBODIMENTS

The following descriptions of the preferred embodiments are provided to understand the features and the structures of the present invention.

Figure 1:
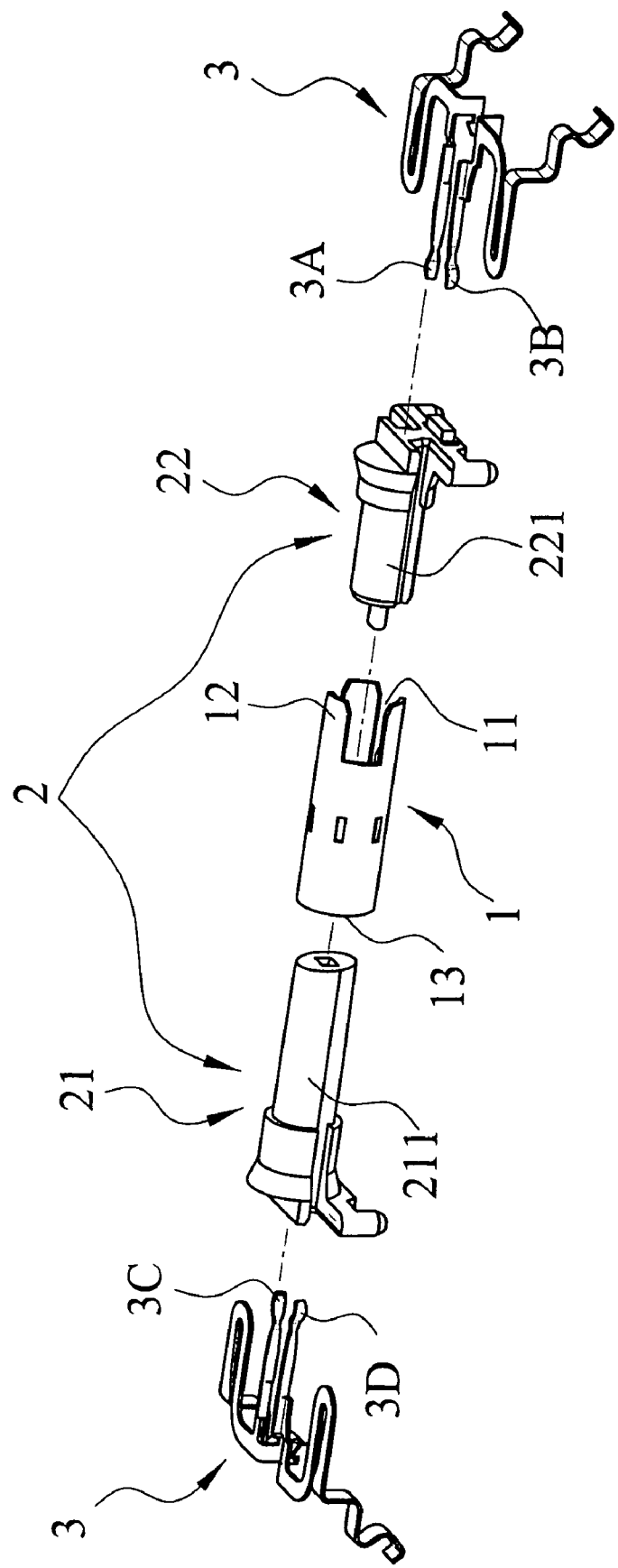
FIG. 1 is a perspective view of the preferred embodiment according to the present invention.
Figure 2:
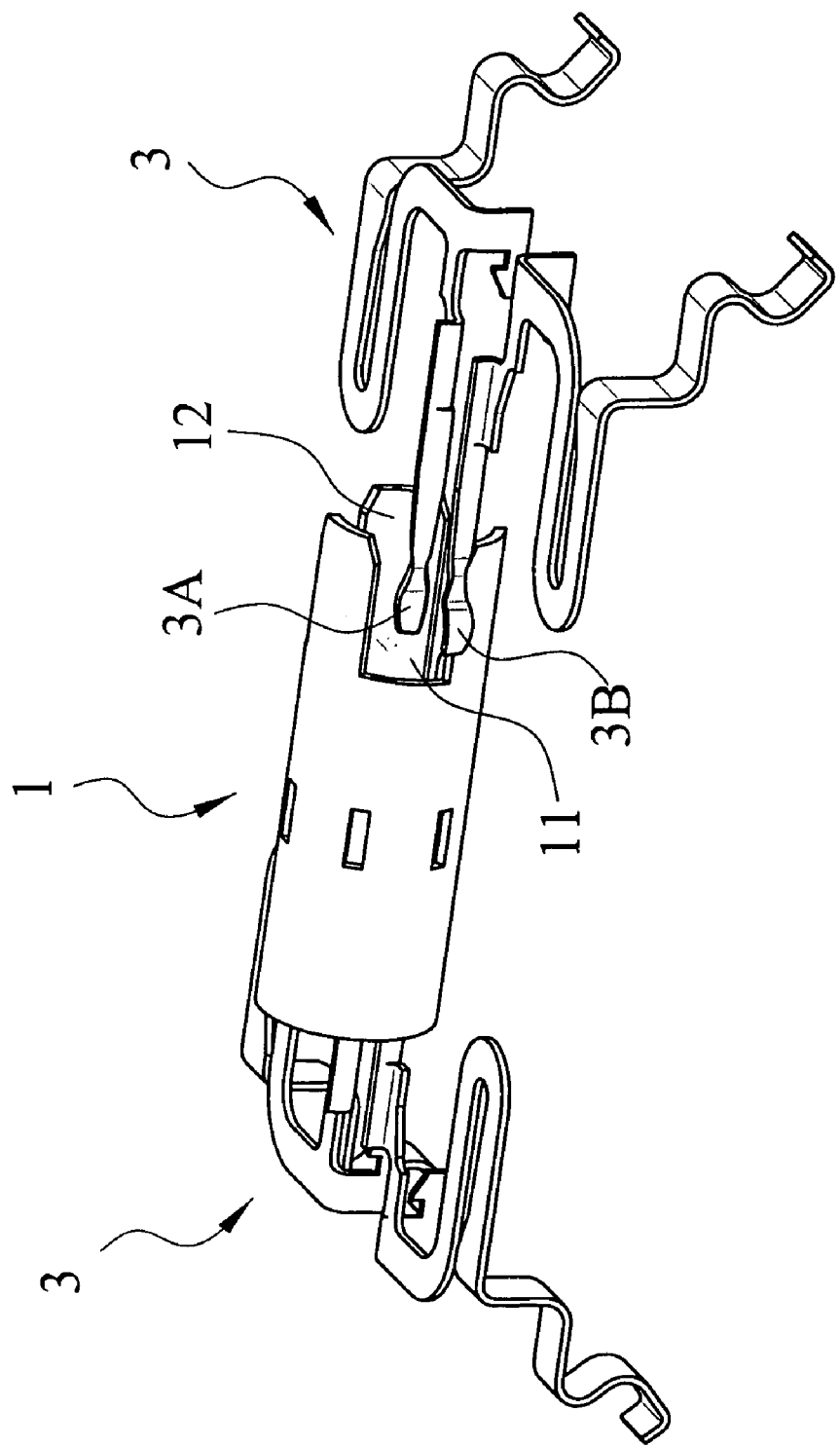
FIG. 2 is an exploded view of the structure showing the conductive ring and the terminals of the preferred embodiment according to the present invention.
Figure 3:
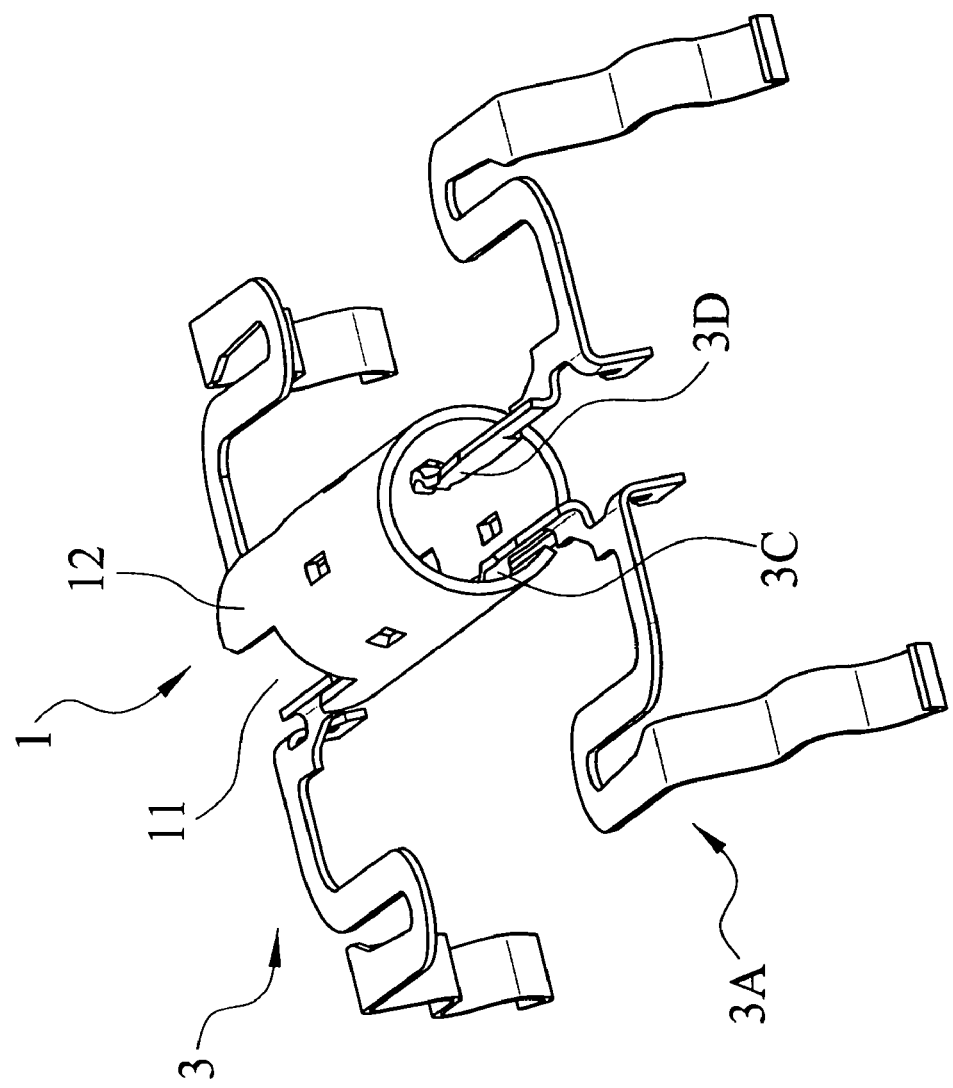
FIG. 3 is an exploded view of the structure from another angle showing the conductive ring and the terminals of the preferred embodiment according to the present invention.

Please refer to FIG. 1 through FIG. 3, which are a perspective view of the preferred embodiment, an exploded view of the structure showing the conductive ring and the terminals of the preferred embodiment, and an exploded view of the structure from another angle showing the conductive ring and the terminals of the preferred embodiment, according to the present invention. As shown in the figures, the present invention is a roller construction with direction finding for a mobile navigation device, comprising a conductive ring 1, a support 2 and a plurality of terminals 3. By turning the conductive ring 1 to interact with the terminals 3, signals with time differential are sent so that the first rolling direction can be differed from the second rolling direction.

The conductive ring 1 is a hollow ring. A plurality of slots 11 is on an end surface of the conductive ring 1, wherein a contacting area 12 is on the inner surface of the protruding part between each two neighboring slots 11. And a whole circle of a contacting surface 13 is on the inner surface at the other end surface of the conductive ring 1, wherein the conductive ring 1 is plugged into an insulation bush (not shown in the figures).

The support 2 can be used to plug the conductive ring 1, wherein the support 2 comprises two braces 21,22 each having a corresponding cantilever 211,221. And the cantilevers 211,221 are plugged in from the two end surfaces of the conductive ring 1 to sustain the conductive ring 1, wherein the ends of the cantilevers 211,221 butt each other by means of matching concaves with corresponding convexes to increase the mechanical strength of the cantilevers 211,221.

In the preferred embodiment, the plurality of terminals 3 is plugged into the conductive ring 1 from the two end surfaces and produces pre-load. (Normally, the terminals would be deformed by the stress when being plugged into the conductive ring.) The plurality of terminals comprises a first terminal 3A and a second terminal 3B which are at an end surface of the conductive ring 1 for sending signals; and a third terminal 3C and a fourth terminal 3D which are for transferring power signals. The first terminal 3A and the second terminal 3B are plugged into the conductive ring 1 at the depth no deeper than the bottoms of the slots 11 of the conductive ring 1; and each terminal 3A,3B,3C,3D individually extends out of the conductive ring 12 to connect with the default circuit contact (which is not shown in the figures). Accordingly, a novel roller construction with direction finding for a mobile navigation device is obtained.

Figure 4:
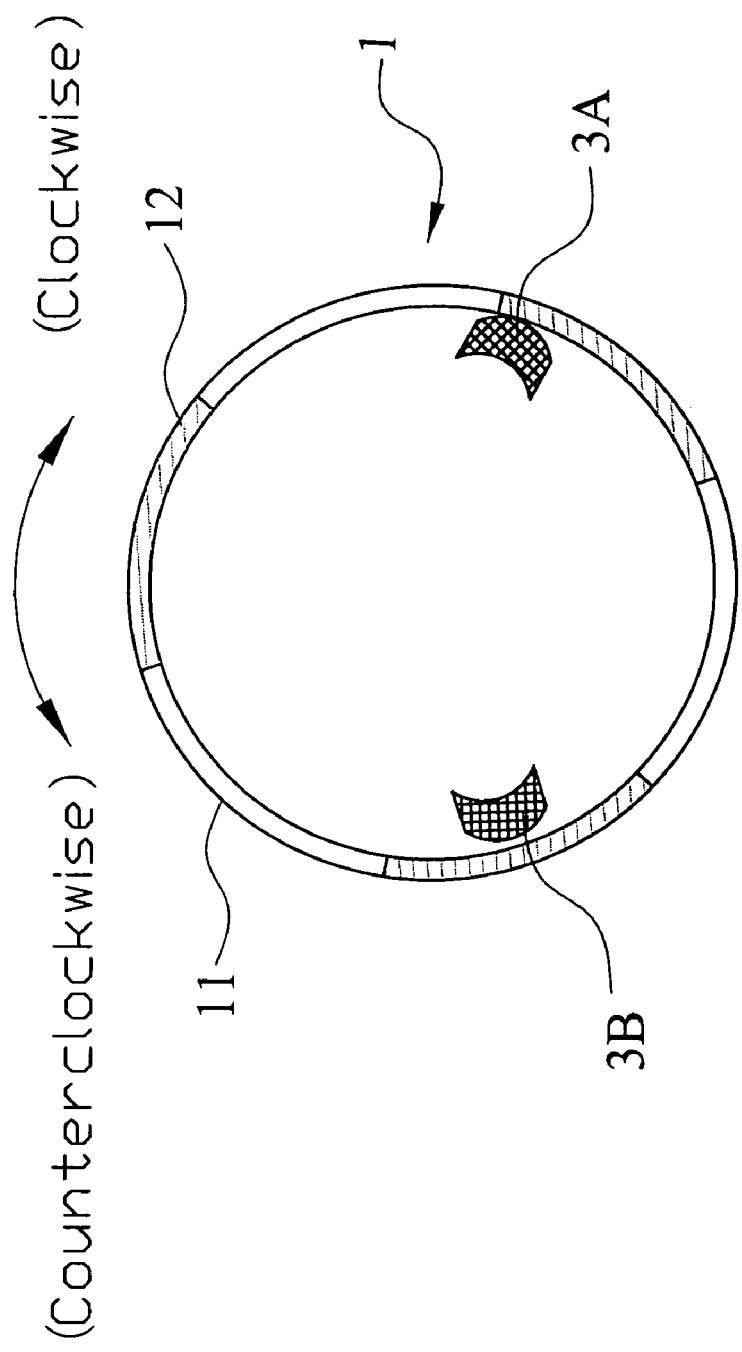
FIG. 4 is a view showing the status of use of the preferred embodiment according to the present invention.

As shown in FIG. 4, in the present invention, the first terminal 3A and the second terminal 3B are at the corresponding place on the inner surface of the conductive ring 1; and the included angle formed by the first terminal 3A and the second terminal 3B to the center of the conductive ring 1 is 150 degrees. There are three contacting areas 12 in the conductive ring 1, wherein a slot 11 fully covered with insulating material is between each two neighboring contacting areas 12. And, the third terminal 3C and the fourth terminal 3D are constantly transferring power signals. Therefore, when the first terminal 3A or the second terminal 3B is connected with the contacting area 12 of the conductive ring 1, the first terminal 3A or the second terminal 3B would then transfer a high potential.

Because there are three contacting areas 12 in the conductive ring 1 and a slot 11 fully covered with insulating material is between each two neighboring contacting areas 12, the angle for each contacting area 12 and slot 11 is 60 degrees. Therefore, the included angle for the first terminal 3A and the second terminal 3B may cover a contacting area 12 and a slot 11 with 30 degrees left. And, the first terminal 3A and the second terminal 3B may be connected with the contacting area 12 'and' the slot 11 at the same time, or may be connected with the contacting area 12 'or' the slot 11 at the same time. A person who is used to this technology would know that the angle in the present invention is only for forming a specific status of phase differential between the first terminal 3A and the second terminal 3B and is not intended to unnecessarily limit the scope of the present invention.

Figure 5:
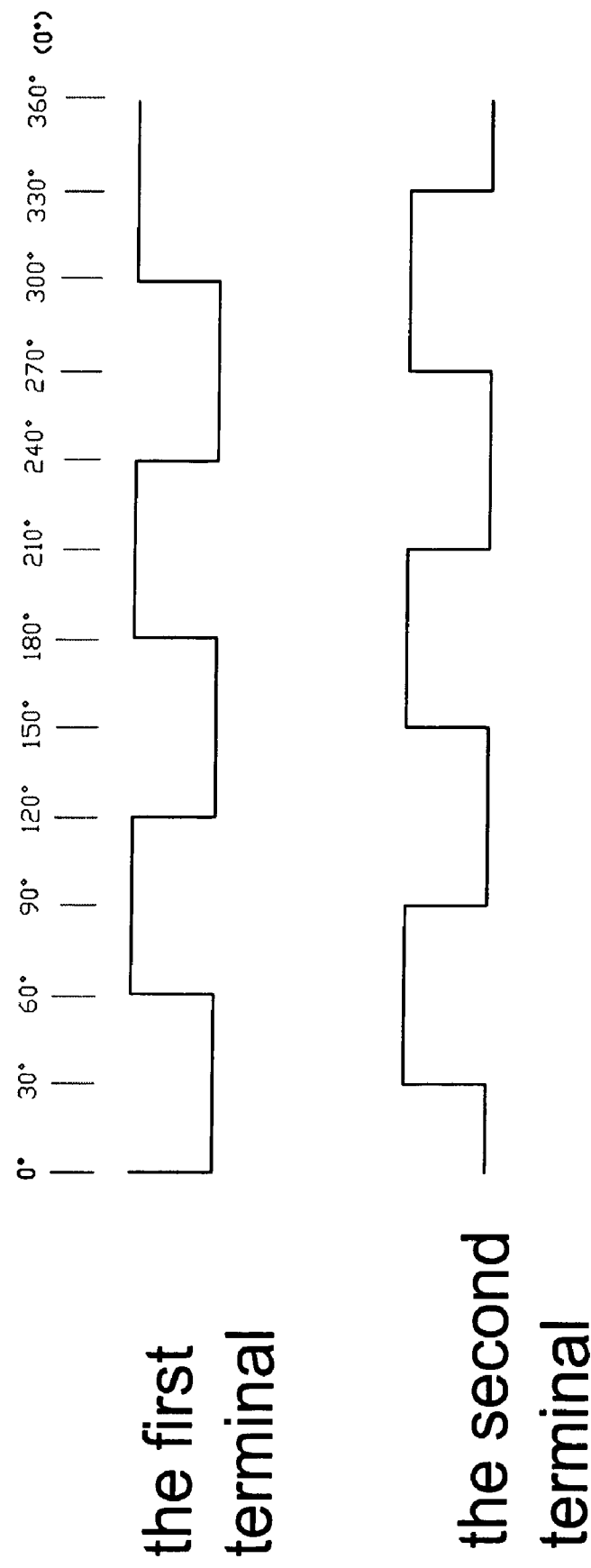
FIG. 5 is a view showing the signals sent when the preferred embodiment turns clockwise according to the present invention.
Figure 6A:
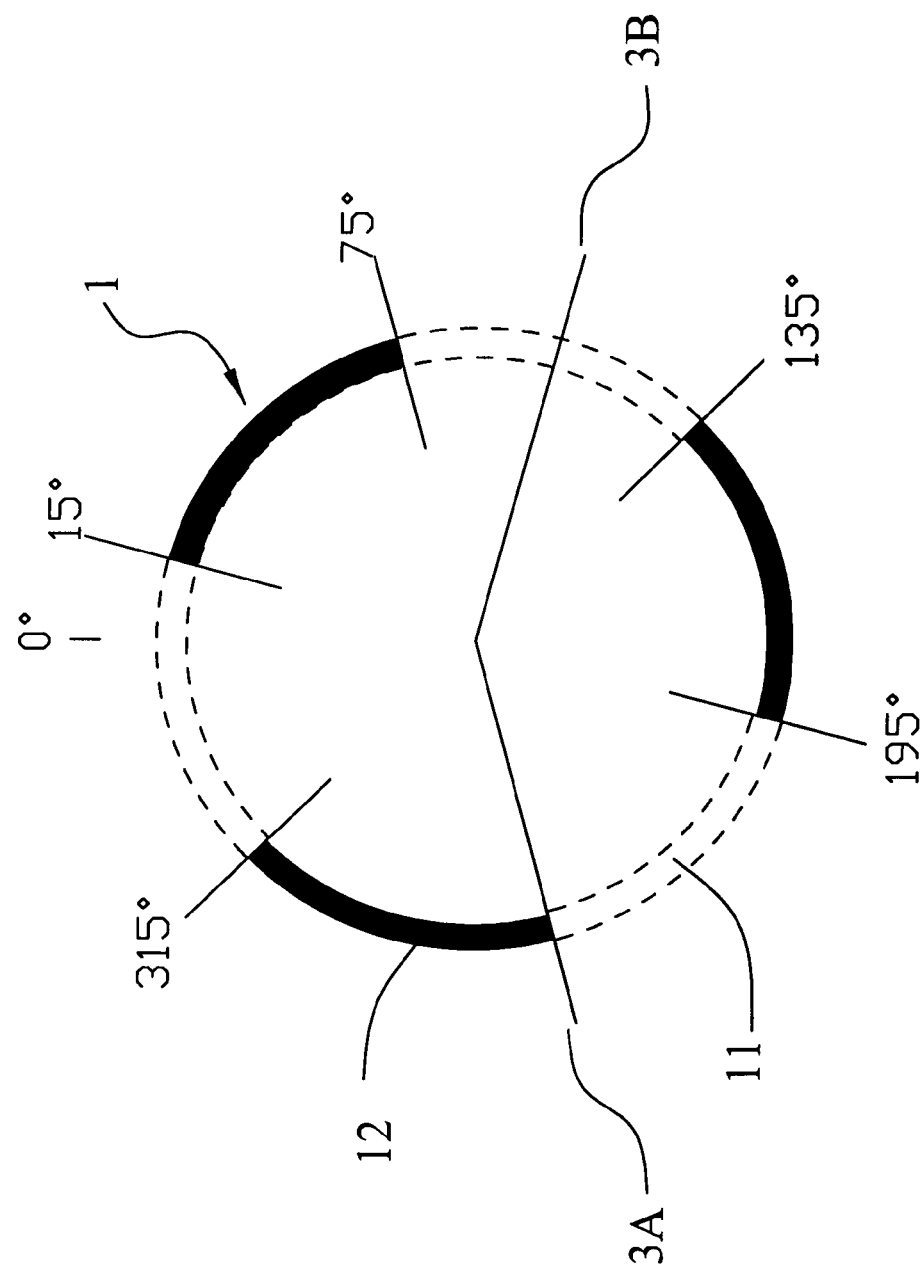
FIG. 6A till FIG. 6L are views showing the contacting angle of the conductive ring and the terminals according to the present invention.
Figure 6B:
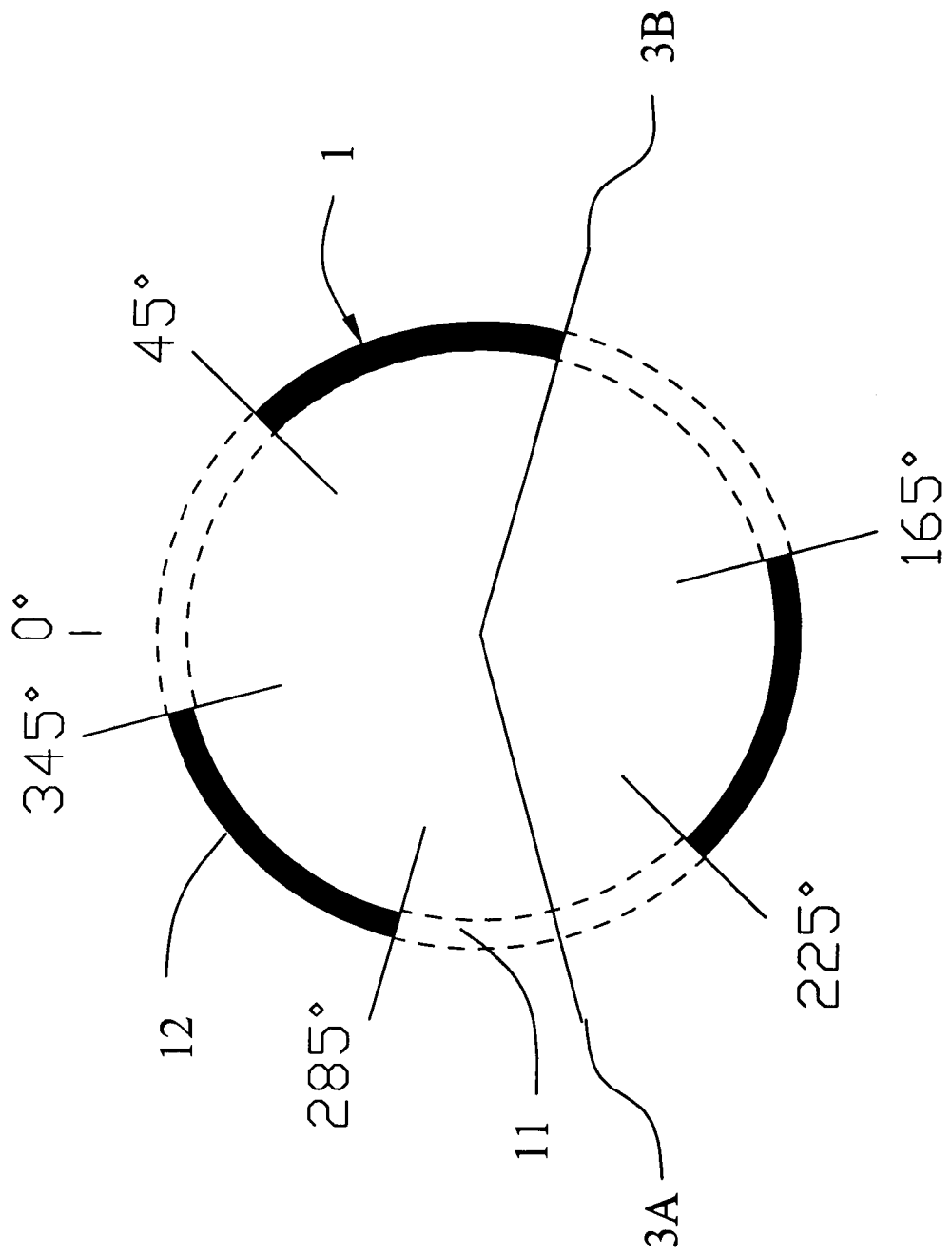
Figure 6D:
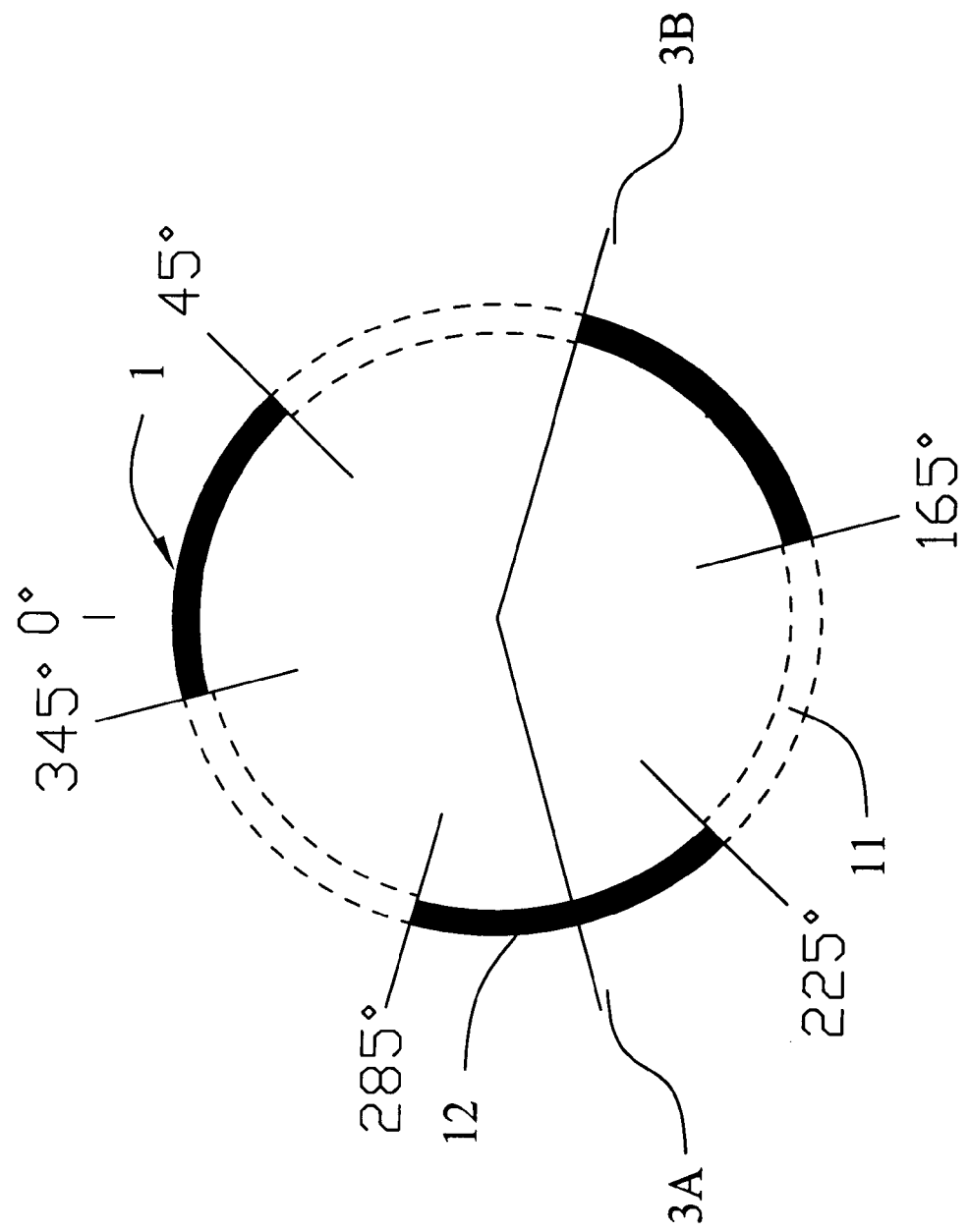

Please refer to FIG. 4 and FIG. 5, which are views showing the status of use of the preferred embodiment and the signals sent by the first 3A and the second 3B terminals when the preferred embodiment turns clockwise, according to the present invention. As shown in the figures, when the user wants to move forward or backward by the present invention, it can be done by solely rolling the insulating bush (not shown in the figures) which would inclusively roll the conductive ring too. At the same time, the third terminal 3C and the fourth terminal 3D are connected with the contacting surface 13 on the inner surface at the other end surface of the conductive ring 1 for transferring power signals (as shown in FIG. 3). The first terminal 3A and the second terminal 3B are to send signals in coordination with the conductive ring 1. The contacting areas 12 and the slots 11 of the conductive ring 1 are set with an interval of an angle of 60 degrees between each two to form three contacting areas 12. And, the included angle formed by the first terminal 3A and the second terminal 3B to the center of the conductive ring 1 is 150 degrees As shown in FIG. 6A, the conductive ring is at the initial position (0 degree) and the first terminal 3A is at the position of 255 degrees and the second terminal 3B is at the position of 105 degrees. The first terminal 3A is connected with the contacting area 12 in a conductive status while the second terminal 3B is in the slot 11 in a non-conductive status. As shown in FIG. 6B, when the conductive ring 1 is rolled in the first rolling direction (clockwise) for 30 degrees, the first terminal 3A turns to the slot 11 in a non-conductive status while the second terminal 3B is connected with the contacting area 12 in a conductive status. As shown in FIG. 6C and FIG. 6D, when the conductive ring 1 is rolled in the first rolling direction (clockwise) for 60 degrees and 90 degrees, the first terminal 3A and the second terminal 3B are individually connected with the contacting area 12 in a conductive status.

Figure 6E:
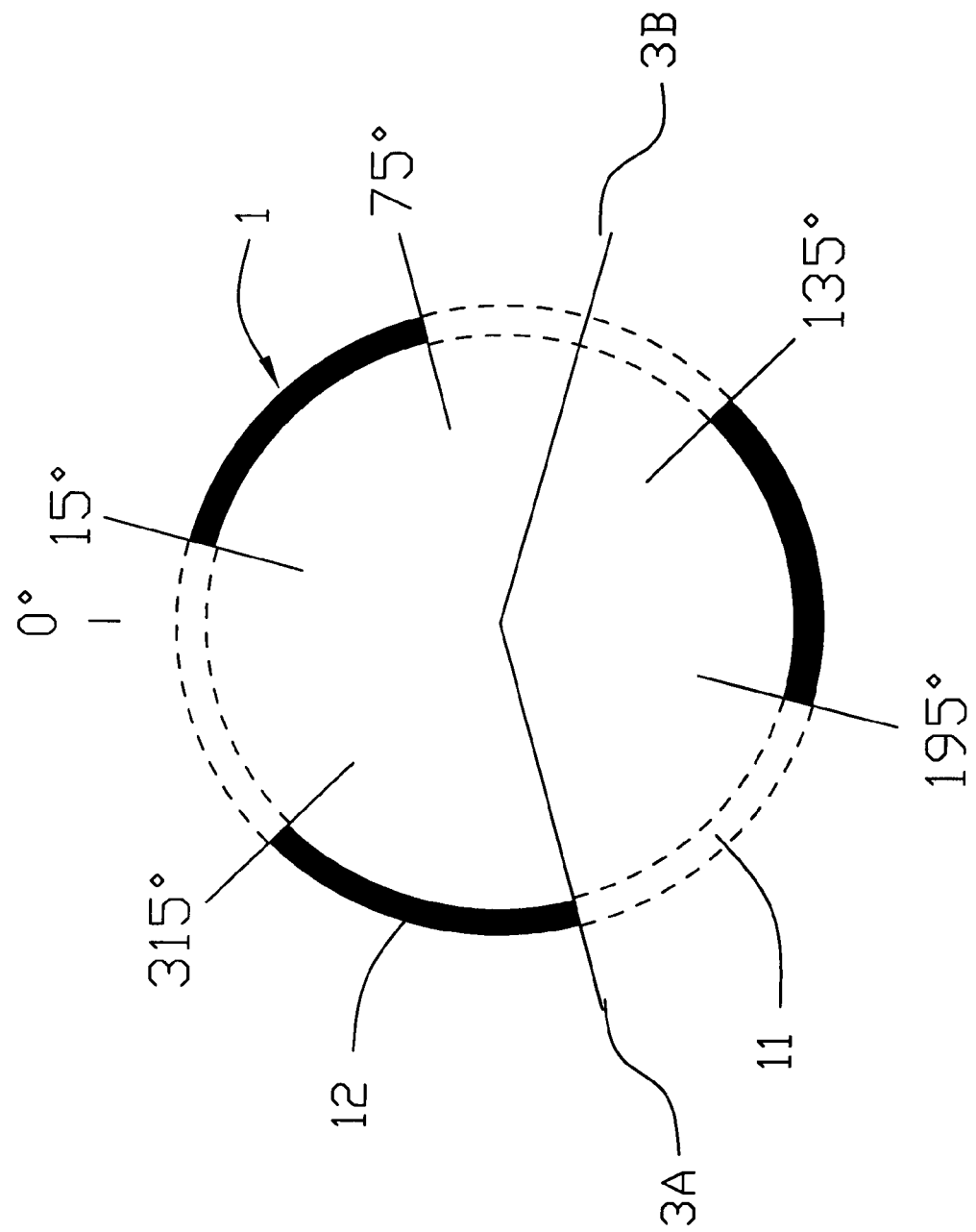
Figure 6F:
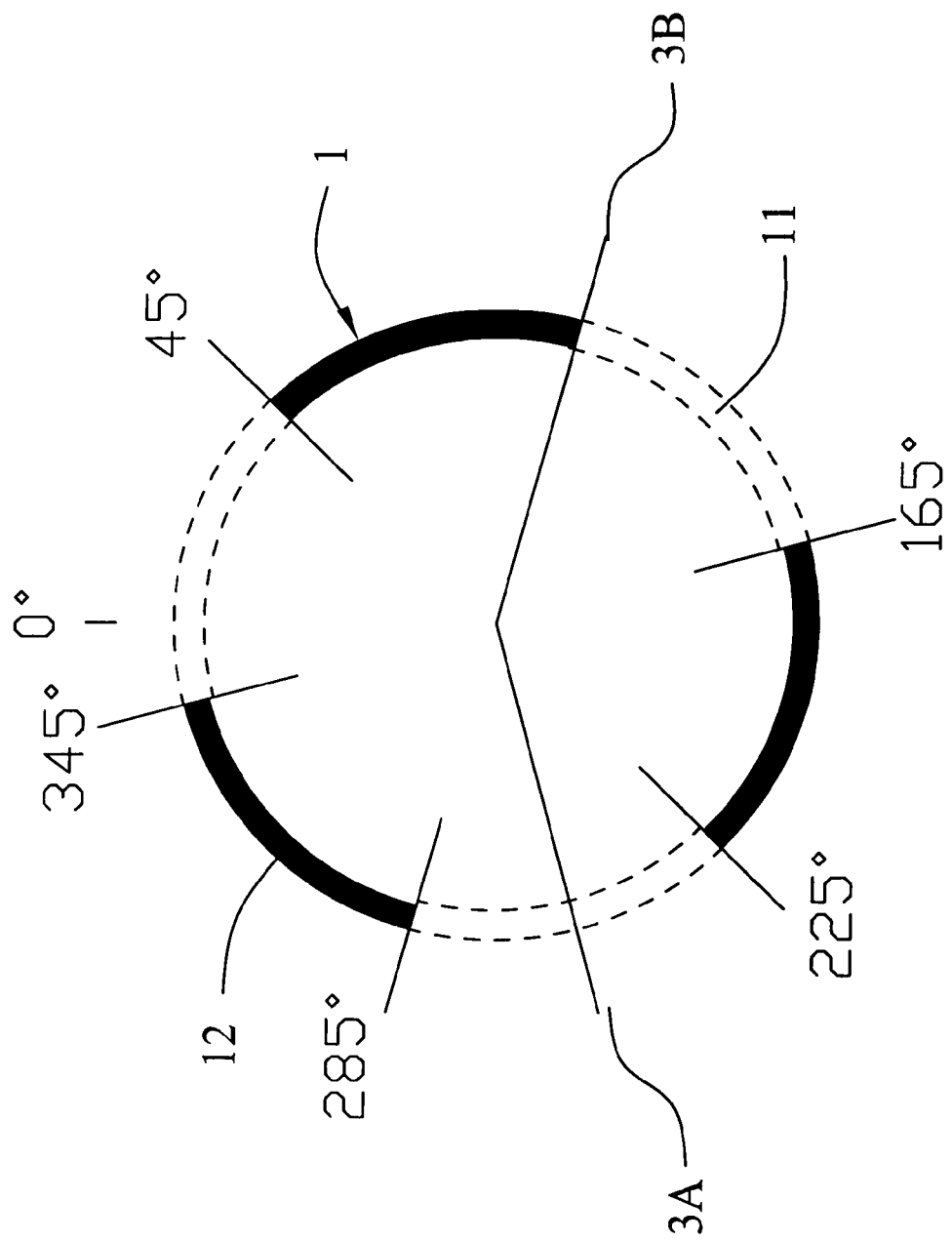
Figure 6:
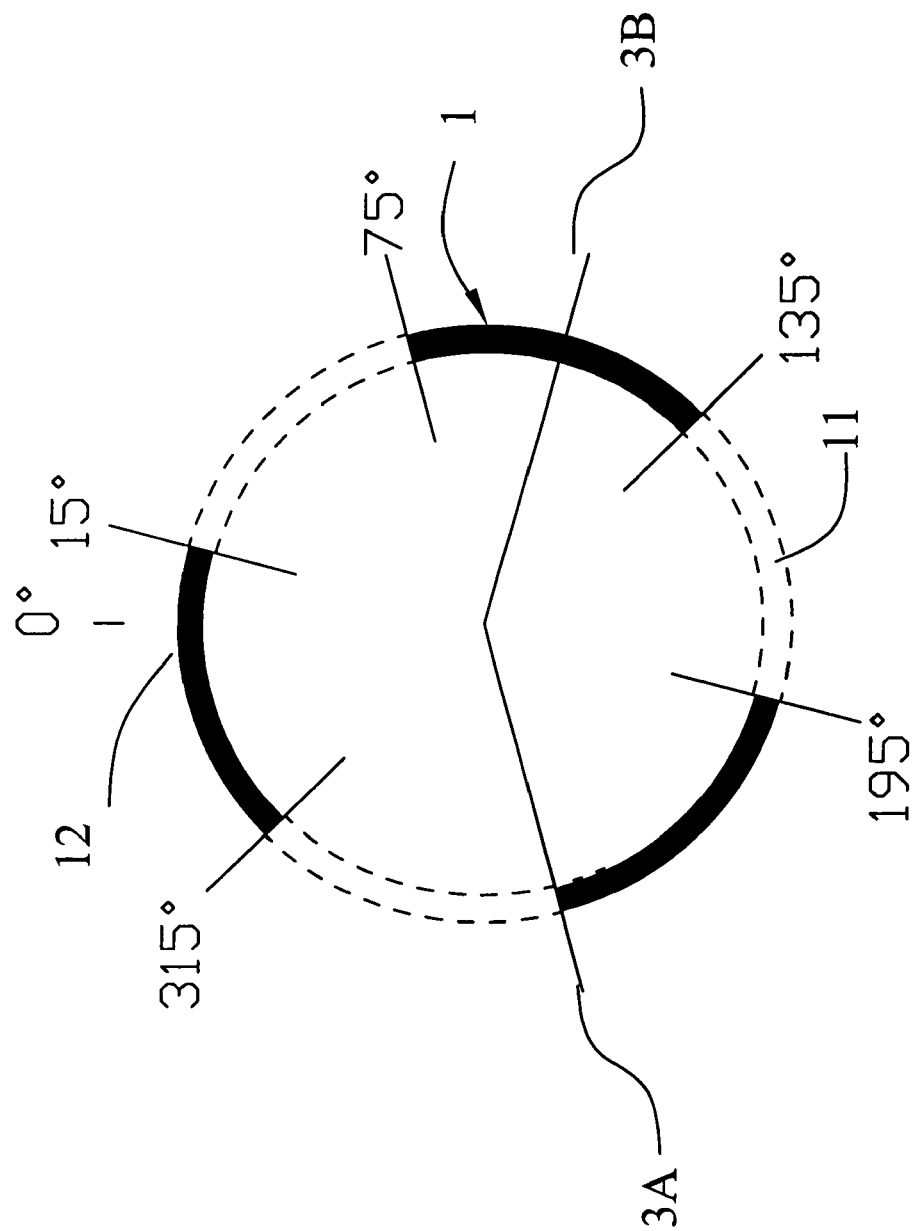
Figure 6H:
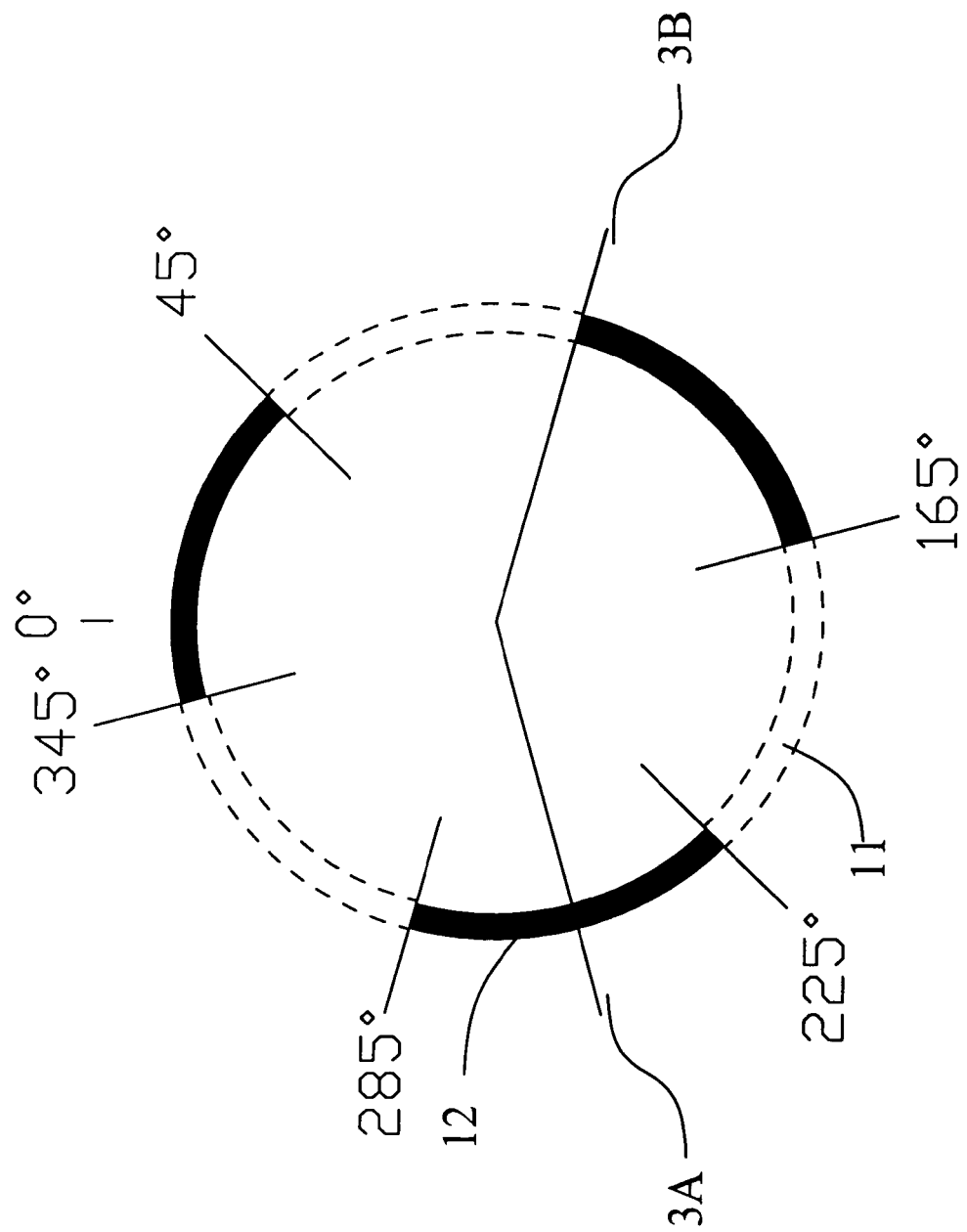
Figure 6:
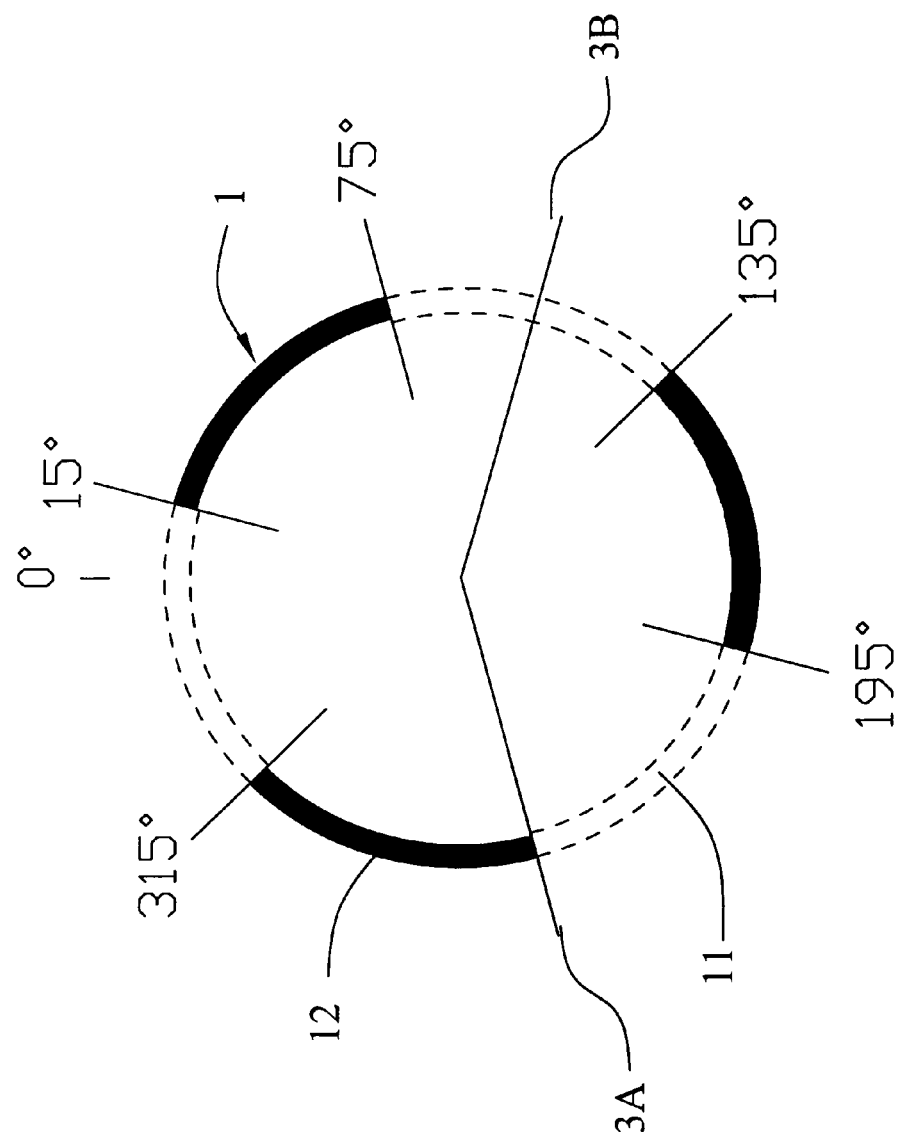
Figure 6:
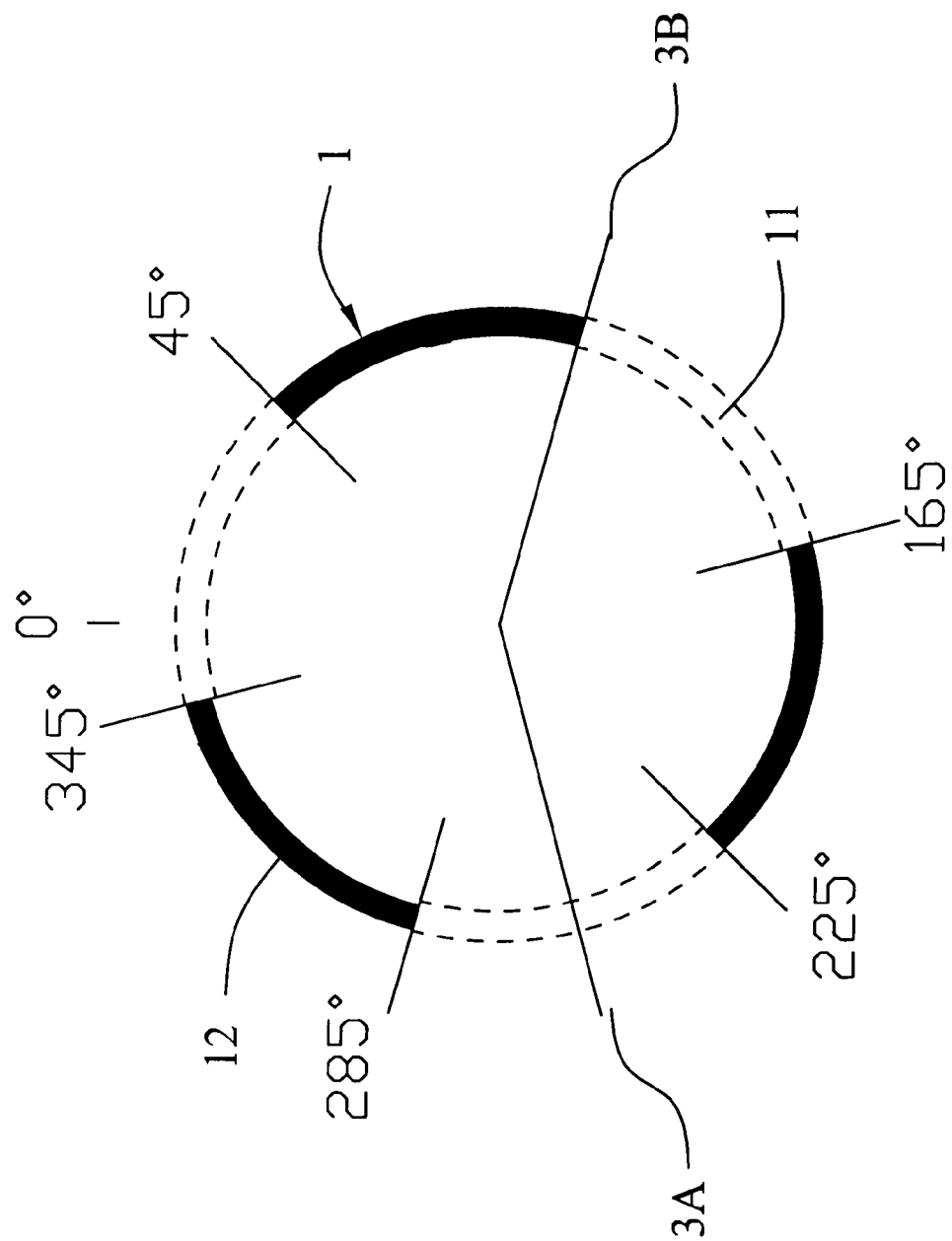

When the conductive ring 1 is rolled forward for 120 degrees, the first terminal 3A is connected with the contacting area 12 in a conductive status while the second terminal 3B turns to the slot 11 in a non-conductive status. (As shown in FIG. 6E) When the conductive ring 1 is rolled forward for 150 degrees, the first terminal 3A turns to the slot 11 in a non-conductive status while the second terminal 3B is connected with the contacting area 12 in a conductive status. (As shown in FIG. 6F) When the conductive ring 1 is rolled forward for 180 degrees and 210 degrees, the first terminal 3A and the second terminal 3B are individually connected with the contacting area 12 in a conductive status. (As shown in FIG. 6G and FIG. 6H)

Figure 6K:
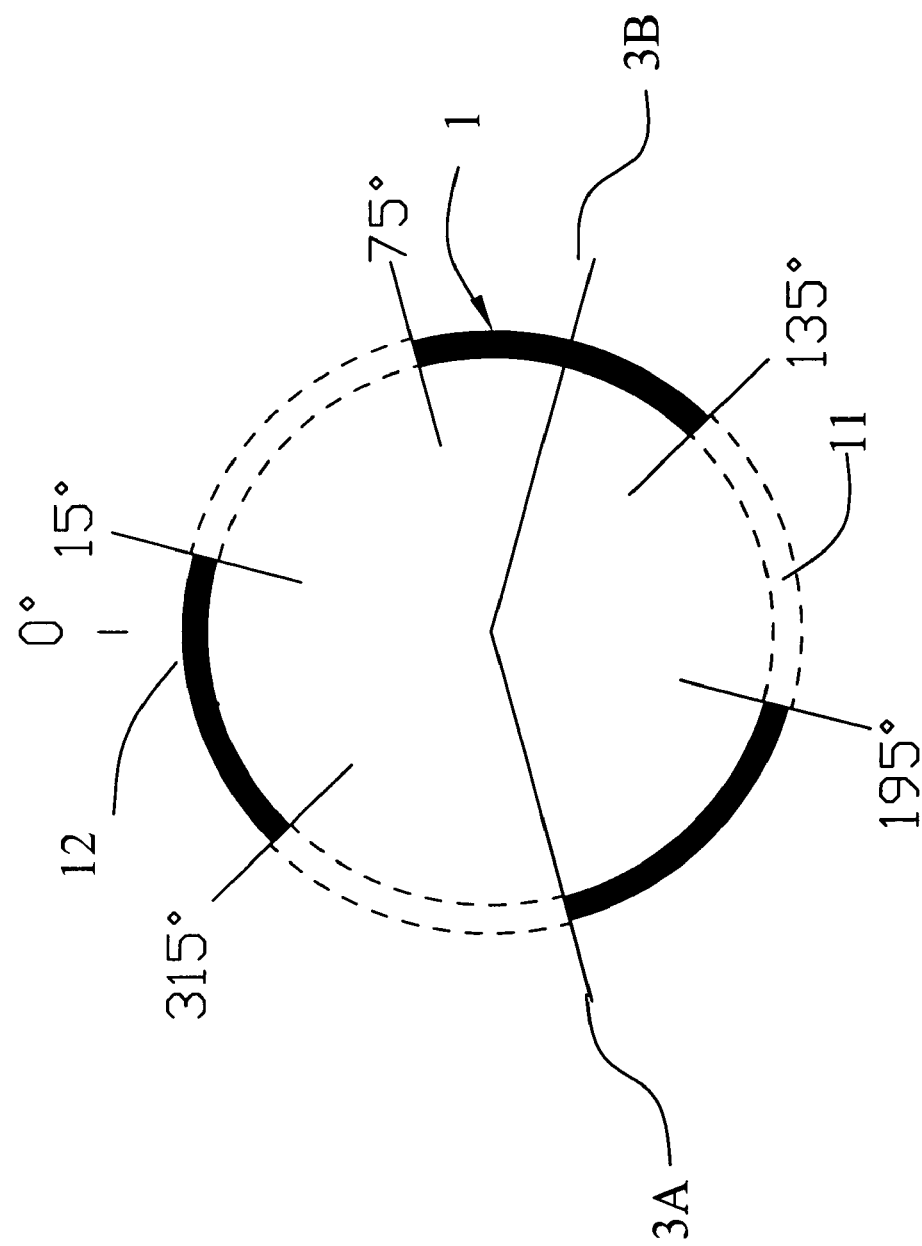
Figure 6:
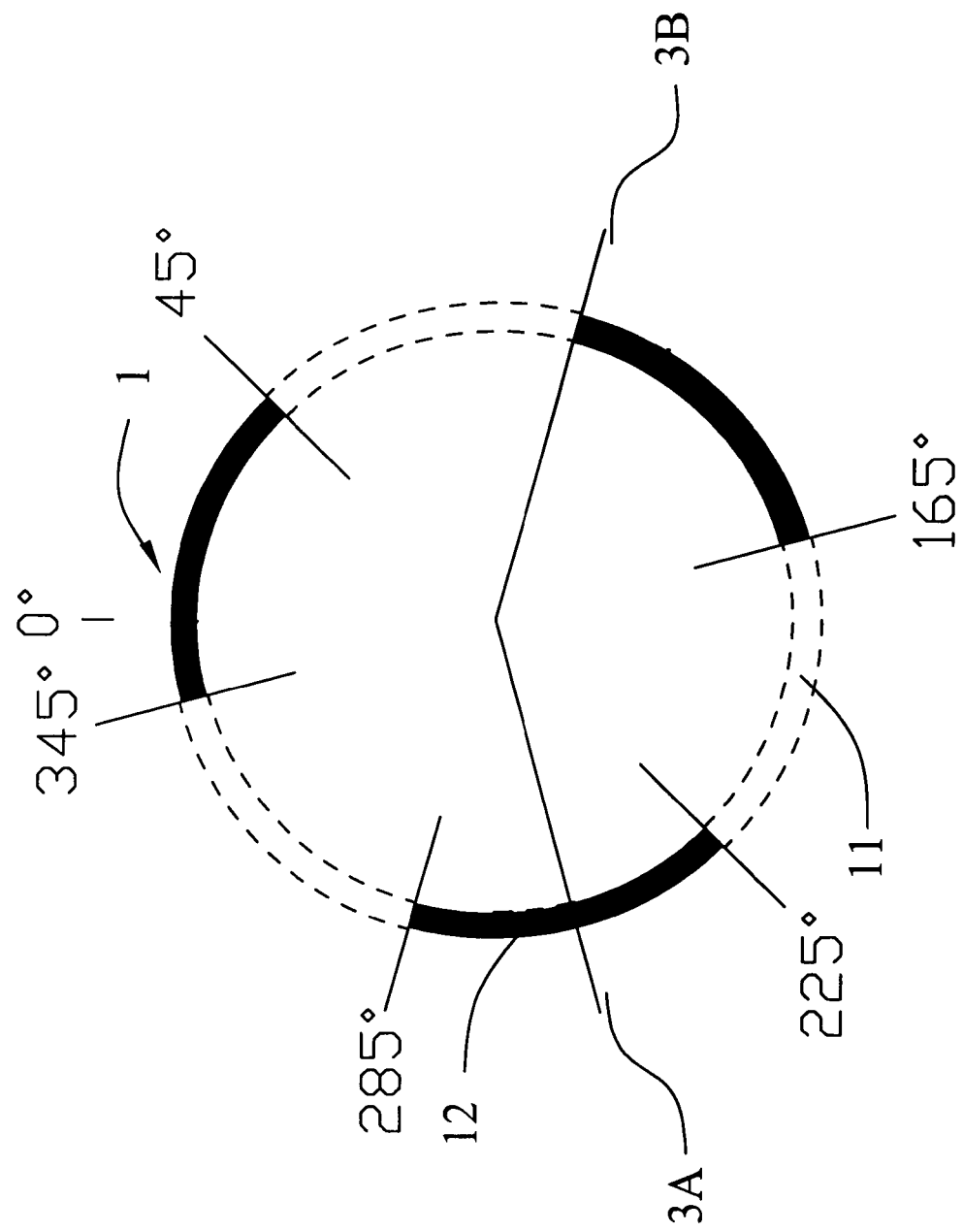

When the conductive ring 1 is rolled forward for 240 degrees, the first terminal 3A is connected with the contacting area 12 in a conductive status while the second terminal 3B turns to the slot 11 in a non-conductive status. (As shown in FIG. 6I) When the conductive ring 1 is rolled forward for 270 degrees, the first terminal 3A turns to the slot 11 in a non-conductive status while the second terminal 3B is connected with the contacting area 12 in a conductive status. (As shown in FIG. 6J) When the conductive ring 1 is rolled forward for 300 degrees and 330 degrees, the first terminal 3A and the second terminal 3B are individually connected with the contacting area 12 in a conductive status. (As shown in FIG. 6K and FIG. 6L)

Accordingly, the first terminal 3A and the second terminal produce constant and periodic signals in the first rolling clockwise direction.

Figure 7:
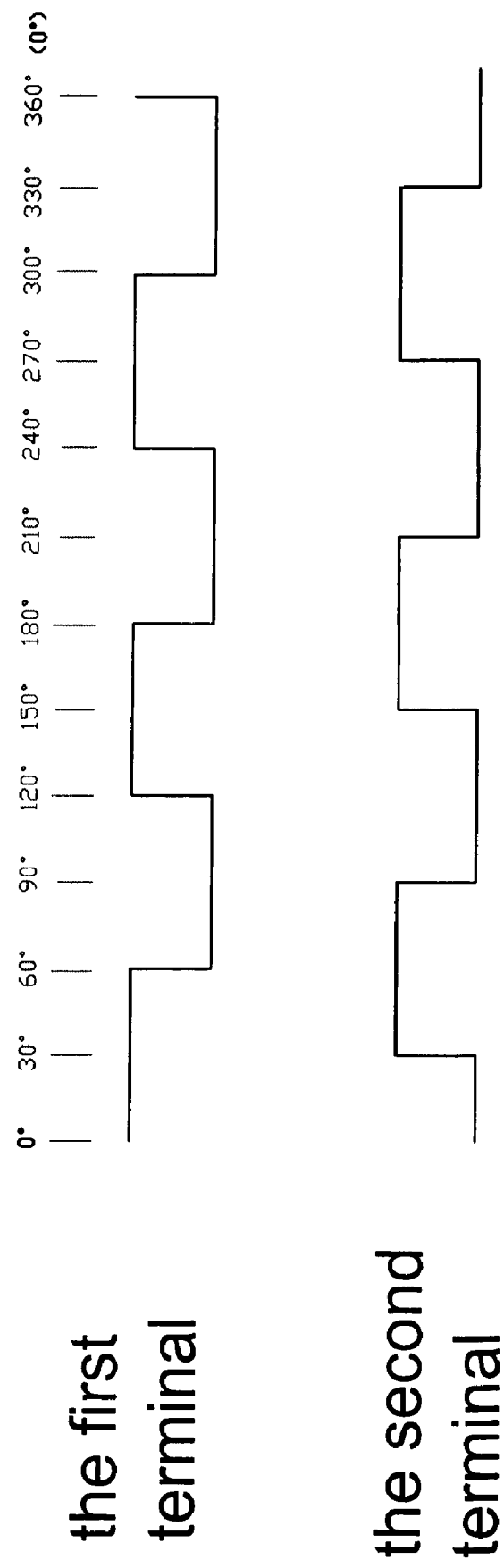
FIG. 7 is a view showing the signals sent when the preferred embodiment turns counterclockwise according to the present invention.
Figure 8:
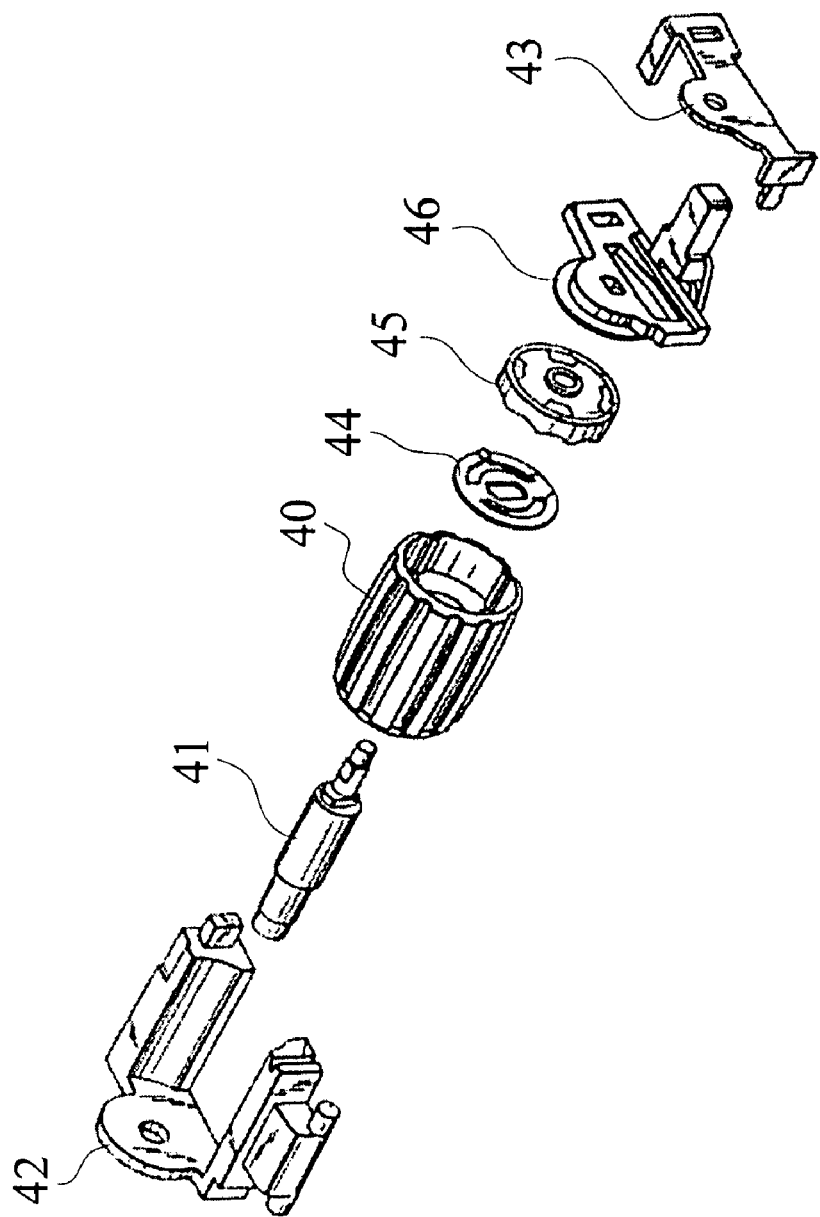
FIG. 8 is a perspective view of the prior art.

On the contrary, when the conductive ring 1 is rolled in the second rolling counterclockwise direction (as shown in FIG. 7), the second terminal 3B in an original conductive status turn to the slot 11 in a non-conductive status while the first terminal 3A in an original non-conductive status turns to connected with the contacting area 12 in a conductive status. Therein, constant and periodic signals indicating a rolling in the second rolling direction is produced and sent to the output terminal. Accordingly, by the IC (integrated circuit) of the circuit board, the first rolling clockwise direction and the second rolling counterclockwise direction can be differed by the leading and the lagging signal differential using electric potential differential.

The preferred embodiments herein disclosed are not intended to unnecessarily limit the scope of the present invention. Therefore, simple modifications or variations belonging to the equivalent of the scope of the claims and the instructions disclosed herein for a patent are all within the scope of the present invention.

What is claimed is:

1. A roller construction with direction finding for a mobile navigation device, comprising:
   a conductive ring in a hollow shape with a plurality of slots where a contacting area is on an inner surface of a protruding part between each two neighboring said slots; and a plurality of terminals plugged into said conductive ring from both two end surfaces of said conductive ring to produce prestress on an inner surface of said conductive ring, wherein said terminals at one of said two end surfaces are plugged into said conductive ring at a depth no deeper than the bottoms of said slots, and wherein each said terminal individually extends out of said conductive ring to be electrically connected with a default circuit contact.

2. The roller construction according to claim 1, wherein an inner surface of the other said end surface is a smooth contacting surface.

3. The roller construction according to claim 1, wherein said conductive ring is plugged with a support.

4. The roller construction according to claim 3,
wherein said support comprises two braces each with a corresponding cantilever, and
wherein said cantilevers of said two braces are plugged in from both two end surfaces of said conductive ring to support said conductive ring.

5. The roller construction according to claim 3, wherein the tips of said cantilevers of said two braces butt each other to increase the mechanical strength of said cantilevers.

6. The roller construction according to claim 3, wherein the tips of said cantilevers of said two braces butt each other by way of matching concaves with corresponding convexes.

7. The roller construction according to claim 1, wherein a plurality of said terminals comprises a first terminal and a second terminal at an end surface of said conductive ring to send signals.

8. The roller construction according to claim 7, wherein an included angle formed by said first terminal and said second terminal to the center of said conductive ring 1 is 150 degrees.

9. The roller construction according to claim 1, wherein a plurality of said terminals comprises a third terminal and a fourth terminal at an end surface of said conductive ring to transfer power signals.

10. The roller construction according to claim 1, wherein said slots and said contacting areas are set with an interval of an angle of 60 degrees.

* * * * *